United States Patent
Shimada

(10) Patent No.: US 12,508,725 B2
(45) Date of Patent: Dec. 30, 2025

(54) BALANCER UNIT FOR BALANCING ROTARY ELEMENT OF MACHINE, AND MACHINE

(71) Applicant: Fanuc Corporation, Yamanashi (JP)

(72) Inventor: Tadatoki Shimada, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 18/693,193

(22) PCT Filed: Sep. 28, 2021

(86) PCT No.: PCT/JP2021/035680
§ 371 (c)(1),
(2) Date: Mar. 19, 2024

(87) PCT Pub. No.: WO2023/053217
PCT Pub. Date: Apr. 6, 2023

(65) Prior Publication Data
US 2024/0383159 A1   Nov. 21, 2024

(51) Int. Cl.
*B25J 19/00* (2006.01)

(52) U.S. Cl.
CPC .................... *B25J 19/0016* (2013.01)

(58) Field of Classification Search
CPC . B25J 19/0008; B25J 19/0012; B25J 19/0016
See application file for complete search history.

(56) References Cited

U.S. PATENT DOCUMENTS 8,978,507 B2 * 3/2015 Long ............... B25J 19/0016
901/15

10,391,642 B2 * 8/2019 Harada ............ B25J 19/0012
2019/0321987 A1   10/2019 Tanno et al.

FOREIGN PATENT DOCUMENTS

| CN | 108015807 A | | 5/2018 | | |
|---|---|---|---|---|---|
| CN | 108098754 A | * | 6/2018 | .......... | B25J 19/0008 |
| EP | 3463768 B1 | * | 5/2020 | .......... | B25J 19/0016 |
| JP | S606388 A | | 1/1985 | | |
| JP | S61102749 U | | 6/1986 | | |
| JP | H11216697 A | | 8/1999 | | |
| JP | H11277479 A | | 10/1999 | | |
| JP | 2019188513 A | | 10/2019 | | |
| KR | 200468355 Y1 | * | 8/2013 | .......... | B25J 19/0016 |

OTHER PUBLICATIONS

STIC Search Report (Year: 2025).*
International Search Report (PCT/ISA/210) with translation and Written Opinion (PCT/ISA/237) mailed on Nov. 30, 2021, by the Japan Patent Office as the International Searching Authority for International Application No. PCT/JP2021/035680. (8 pages).

* cited by examiner

*Primary Examiner* — Bobby Rushing, Jr.
(74) *Attorney, Agent, or Firm* — Buchanan Ingersoll & Rooney PC

(57) ABSTRACT

A balancer unit includes a biasing mechanism that generates a moment by biasing a rotary element of a machine and a casing that is rotatably supported by the machine with support shafts therebetween, and that accepts the biasing mechanism. The casing has a peripheral wall that surrounds the biasing mechanism and hollow shaft-accepting parts that are provided to the peripheral wall so as to protrude inwardly from the inner peripheral surface of the peripheral wall, and that accept the support shafts in a manner enabling relative rotation.

11 Claims, 12 Drawing Sheets

BALANCER UNIT FOR BALANCING ROTARY ELEMENT OF MACHINE, AND MACHINE

CROSS REFERENCE TO RELATED APPLICATIONS

This is the U.S. National Phase application of PCT/JP2021/035680, filed Sep. 28, 2021, the disclosures of this application being incorporated herein by reference in their entireties for all purposes.

FIELD OF THE INVENTION

The present disclosure relates to a balancer unit for balancing a rotating element of a machine, and a machine.

BACKGROUND OF THE INVENTION

A balancer unit for balancing a rotating element of a machine is known (e.g., PTL 1).

PATENT LITERATURE

PTL 1: JP 11-216697 A

SUMMARY OF THE INVENTION

In the related art, there has been a demand for a technique that can reduce the size and weight of a balancer unit while reducing stress concentration that occurs at a casing of the balancer unit.

According to an aspect of the present disclosure, a balancer unit configured to apply a moment to a rotating element of a machine for balancing the rotating element includes a biasing mechanism configured to generate a moment by biasing the rotating element, and a casing rotatably supported by the machine via a support shaft and configured to accept the biasing mechanism. The casing includes a peripheral wall surrounding the biasing mechanism and a shaft receiving part with a hollow provided at the peripheral wall to project inward from an inner circumferential surface of the peripheral wall and configured to receive the support shaft so as to be relatively rotatable.

According to the present disclosure, it is possible to suppress generation of stress concentration on the casing by supporting rotational movement of the balancer unit by the shaft receiving part so as to project inward from the peripheral wall, thereby preventing the casing from being deformed and damaged. As a result, it is possible to reduce the thickness of the casing of the balancer unit, and thus it is possible to reduce the size and weight of the balancer unit.

DETAILED DESCRIPTION OF EMBODIMENTS OF THE INVENTION

Figure 1:
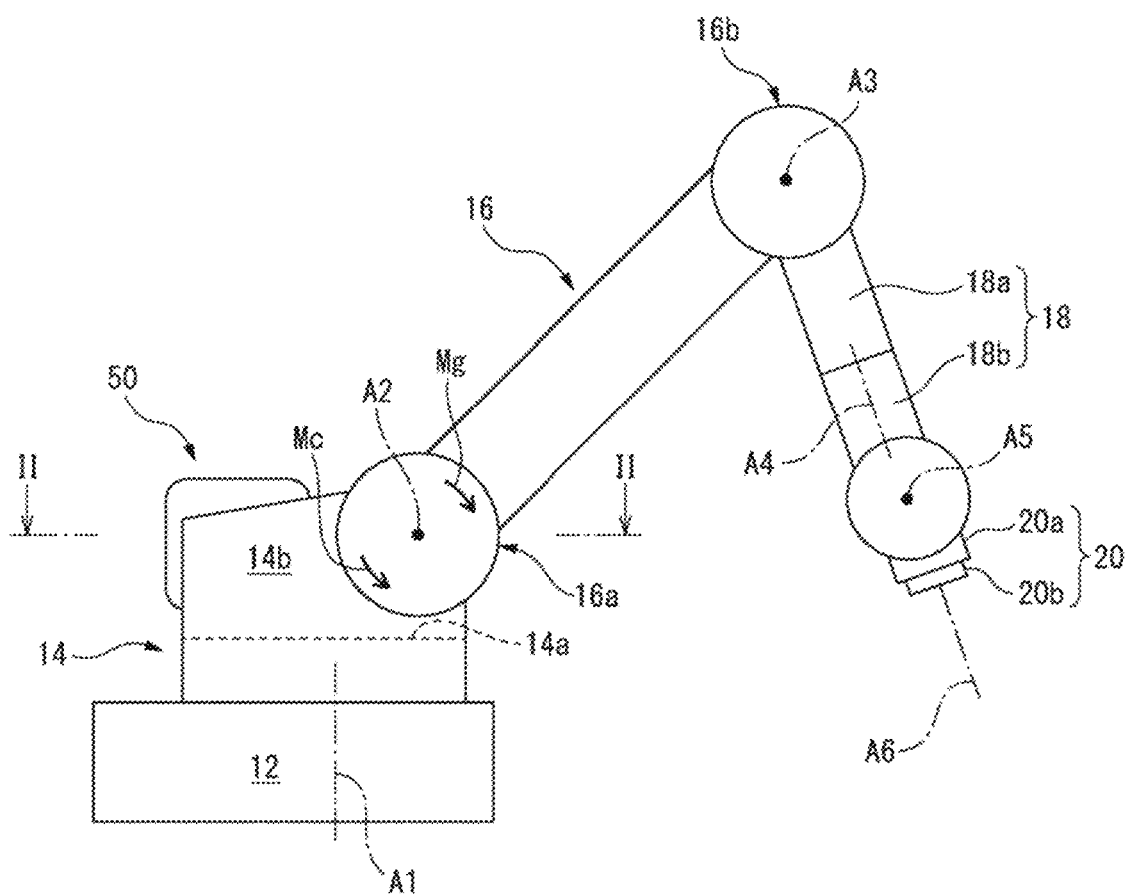
FIG. 1 is a schematic diagram of a machine according to an embodiment.

Embodiments of the present disclosure are described in detail below with reference to the drawings. Note that in various embodiments described below, the same elements are denoted with the same reference numerals, and overlapping description is omitted. Referring first to FIG. 1, a machine 10 according to an embodiment will be described. In the present embodiment, the machine 10 is a vertical articulated robot and includes a robot base 12, a swivel body 14, a lower arm 16, an upper arm 18, and a wrist part 20.

The robot base 12 is fixed on a floor of a work cell or on an automated guided vehicle (AGV). The swivel body 14 is provided at the robot base 12 so as to be rotatable about an axis A1. The axis A1 is parallel to the vertical direction, for example. More specifically, the swivel body 14 includes a base part 14a and a pair of support walls 14b and 14c (FIG. 2) standing from the base part 14a so as to face each other.

The lower arm 16 is provided at the swivel body 14 so as to be rotatable about an axis A2. The axis A2 is orthogonal to the axis A1 (e.g., parallel to the horizontal direction). More specifically, the lower arm 16 includes a proximal end part 16a rotatably supported between the pair of support walls 14b and 14c and a distal end part 16b on the side opposite from the proximal end part 16a.

The upper arm 18 includes a proximal end arm 18a provided at the distal end part 16b of the lower arm 16 so as to be rotatable about an axis A3, and a distal end arm 18b provided at a distal end part of the proximal end arm 18a so as to be rotatable about an axis A4. The axis A3 is parallel to the axis A2, and the axis A4 is orthogonal to the axis A3.

The wrist part 20 includes a wrist base 20a provided at a distal end part of the distal end arm 18b so as to be rotatable about an axis A5, and a wrist flange 20b provided at the wrist base 20a so as to be rotatable about an axis A6. The axis A5 is orthogonal to the axis A4, and the axis A6 is orthogonal to the axis A5.

In the machine 10, an end effector (not illustrated) attached to the wrist flange 20b is arranged at an arbitrary position by rotating the swivel body 14, the lower arm 16, the proximal end arm 18a, the distal end arm 18b, the wrist base 20a, and the wrist flange 20b about the axes A1, A2, A3, A4, A5, and A6, respectively. Thus, each of the swivel body 14, the lower arm 16, the proximal end arm 18a, the distal end arm 18b, the wrist base 20a, and the wrist flange 20b constitutes a rotating element of the machine 10.

The machine 10 further includes a balancer unit 50 that applies a moment Mc to the rotating element for balancing the rotating element of the machine 10. In the present embodiment, the balancer unit 50 is provided at the swivel body 14 in order to balance the lower arm 16. Hereinafter, the balancer unit 50 will be described with reference to FIG. 2.

The balancer unit 50 includes a casing 52 and a biasing mechanism 54. The casing 52 is a hollow member including a center axis A7 and receives the biasing mechanism 54. The casing 52 is rotatably supported by the swivel body 14 via a pair of support shafts 56 and 58.

Note that in the following description, the direction along the axis A7 will be referred to as an axial direction, the radial direction of a circle centered on the axis A7 will be referred to as a radial direction, and the direction around the axis A7 will be referred to as a circumferential direction. Also, the direction indicated by the arrow B in the drawing will be referred to as "axially rearward" for convenience. The casing 52 includes a casing main body 60 and a lid body 62 fixed to the casing main body 60.

Figure 3:
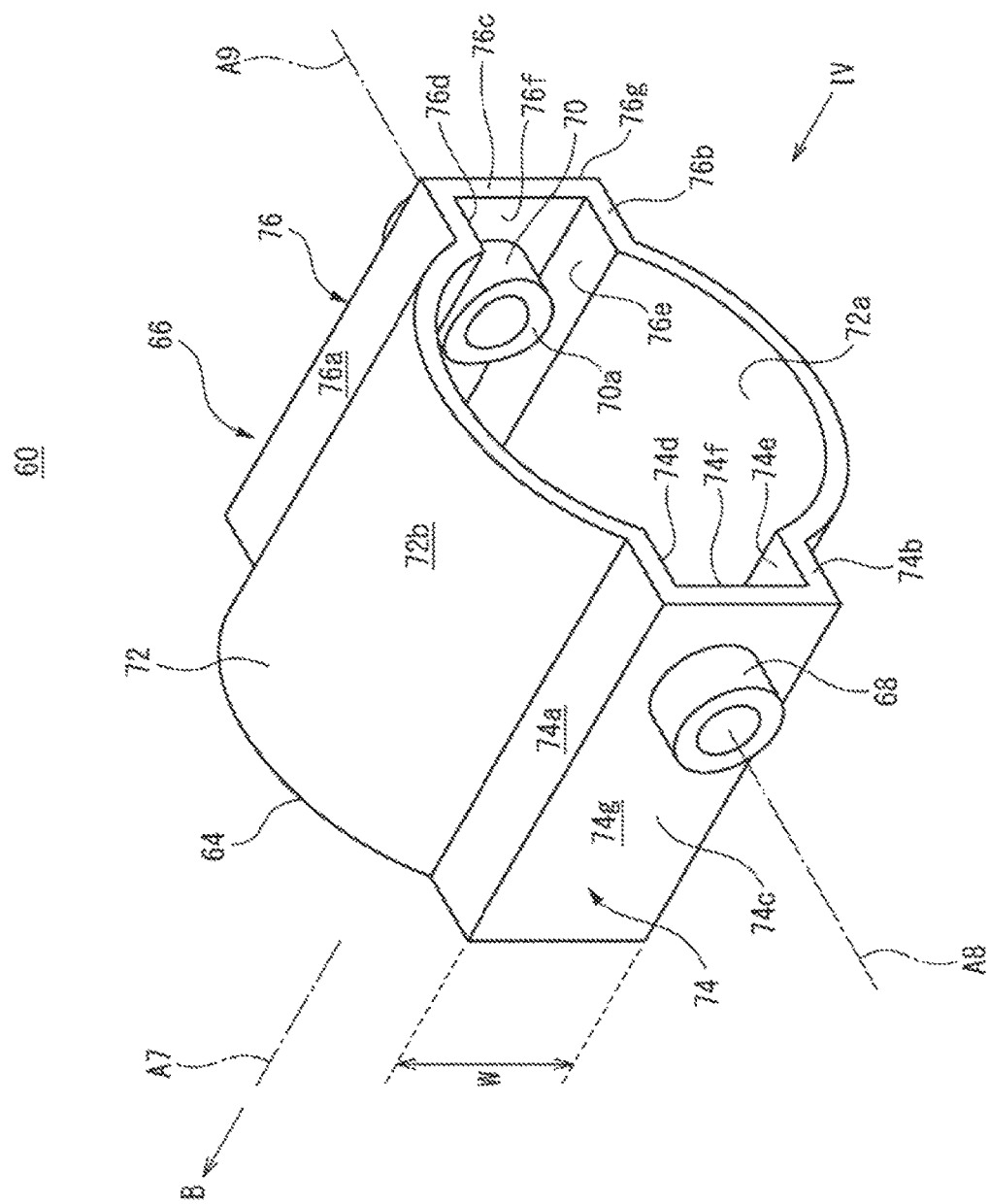
FIG. 3 is a perspective view of a casing main body illustrated in FIG. 2.
Figure 4:
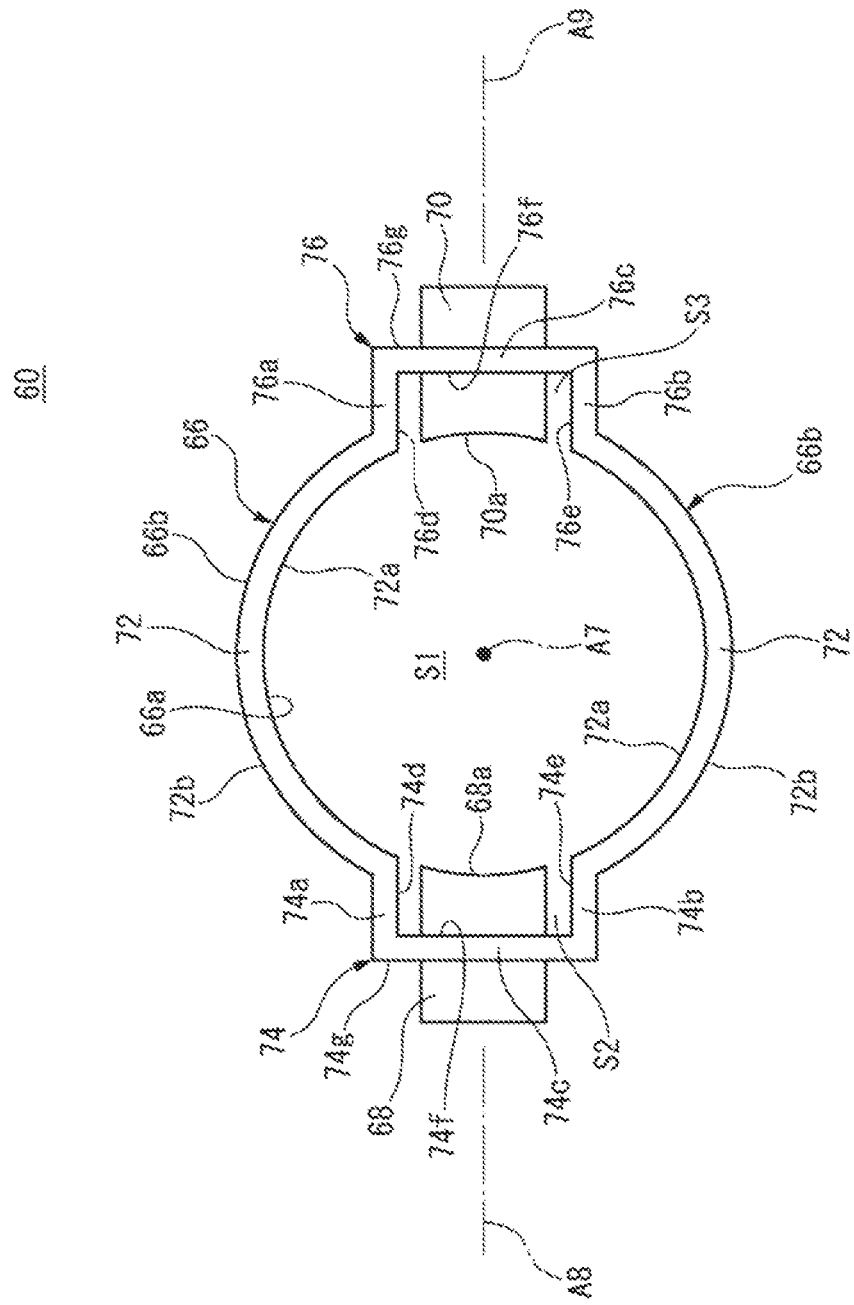
FIG. 4 is a front view of the casing main body illustrated in FIG. 3 when viewed from an axial direction (the arrow IV in FIG. 3).
Figure 5:
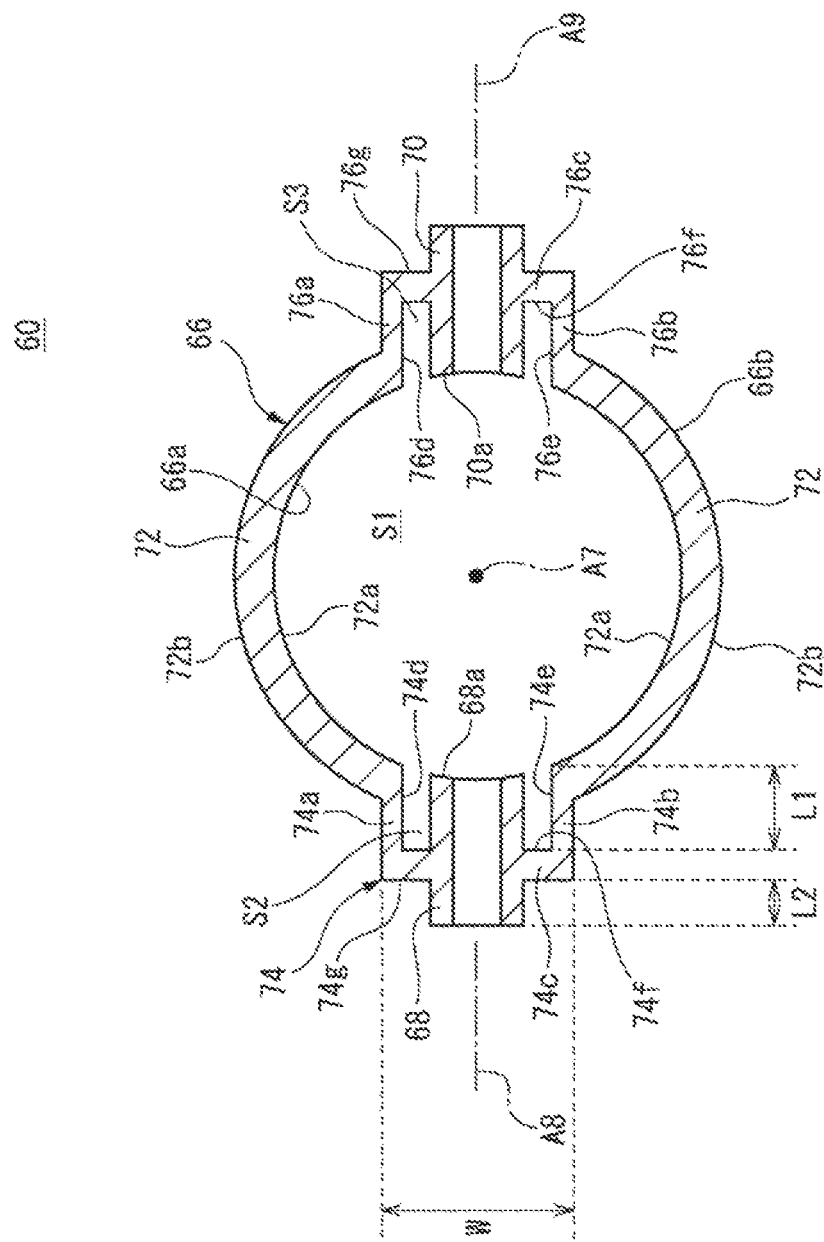
FIG. 5 is a cross-sectional view of the casing main body illustrated in FIG. 3 taken along a plane orthogonal to the axial direction.

Hereinafter, the casing main body 60 will be described with reference to FIGS. 3 to 5. The casing main body 60 includes a bottom wall 64, a peripheral wall 66, and a pair of shaft receiving parts 68 and 70. The bottom wall 64 is a flat plate member and defines an axially rear end of the casing main body 60. The peripheral wall 66 has a tubular shape and extends axially frontward from the bottom wall 64.

More specifically, the peripheral wall 66 includes a center wall 72 and a pair of expanding walls 74 and 76. In the present embodiment, the center wall 72 is a cylindrical member having the axis A7 as a center axis and includes an inner circumferential surface 72a and an outer circumferential surface 72b. The center wall 72 is split into two arc portions by the expanding walls 74 and 76, and the inner circumferential surface 72a of the center wall 72 defines an internal space S1 with a substantially columnar shape.

Each of the expanding walls 74 and 76 is formed integrally with the center wall 72 so as to expand radially outward from the outer circumferential surface 72b of the center wall 72. Each of the expanding walls 74 and 76 has a rectangular outer shape when viewed from the axial direction and extends from the axially front end to the axially rear end of the center wall 72.

More specifically, the expanding wall 74 includes a pair of side wall parts 74a and 74b facing each other and extending radially outward from the outer circumferential surface 72b, and an end wall part 74c extending between the side wall parts 74a and 74b. The side wall parts 74a and 74b and the end wall part 74c substantially orthogonal to each other. An inner surface 74d of the side wall part 74a, an inner surface 74e of the side wall part 74b, and an inner surface 74f of the end wall part 74c define an internal space S2 having a substantially quadrangular prism shape. The internal space S2 is defined to communicate with the internal space S1 and expand radially outward from the internal space S1.

On the other hand, the expanding wall 76 has a rotationally symmetrical shape obtained by rotating the expanding wall 74 180° around the axis A7. Specifically, the expanding wall 76 includes a pair of side wall parts 76a and 76b extending in a direction opposite to the expanding wall 74 from the outer circumferential surface 72b, and an end wall part 76c extending between the side wall parts 76a and 76b. An inner surface 76d of the side wall part 76a, an inner surface 76e of the side wall part 76b, and an inner surface 76f of the end wall part 76c define an internal space S3 with a substantially quadrangular prism shape. The internal space S3 is defined to communicate with the internal space S1 and expand radially outward from the internal space S1.

Also, the inner circumferential surface 72a of the center wall 72 and the inner surface (specifically, the inner surfaces 74d, 74e, 74f, 76d, 76e, and 76f) of the expanding walls 74 and 76 define an inner circumferential surface 66a of the peripheral wall 66. On the other hand, the outer circumferential surface 72b of the center wall 72 and the outer surfaces of the expanding walls 74 and 76 define an outer circumferential surface 66b of the peripheral wall 66. In the present embodiment, the expanding walls 74 and 76 expand with a constant width W (FIG. 5) from the axially front end to the axially rear end of the center wall 72 when viewed from the radial direction of the center wall 72.

The shaft receiving parts 68 and 70 are hollows and are provided at the peripheral wall 66 so as to project inward from the inner circumferential surface 66a of the peripheral wall 66 and project outward from the outer circumferential surface 66b of the peripheral wall 66. Specifically, the shaft receiving part 68 is provided integrally with the end wall part 74c so as to project radially inward from the inner surface 74f of the end wall part 74c and projects radially outward from the outer surface 74g of the end wall part 74c.

The shaft receiving part 68 is a cylindrical member having a center axis A8 and receives the aforementioned support shaft 56 (FIG. 2) so as to be relatively rotatable. The axis A8 is orthogonal to the axis A7. A radially inward end surface 68a of the shaft receiving part 68 is an arc surface centered on the axis A7. The end surface 68a may have the same curvature radius as the inner circumferential surface 72a of the center wall 72 or may have a larger (or smaller) curvature radius than the inner circumferential surface 72a.

On the other hand, the shaft receiving part 70 has a rotationally symmetrical shape obtained by rotating the shaft receiving part 68 180° around the axis A7. Specifically, the shaft receiving part 70 is a cylindrical member having a center axis A9 and receives the aforementioned support shaft 58 (FIG. 2) so as to be relatively rotatable. The shaft receiving part 70 is provided integrally with the end wall part 76c so as to project radially inward from the inner surface 76f of the end wall part 76c of the expanding wall 76 and project radially outward from the outer surface 76g of the end wall part 76c.

Also, an end surface 70a of the shaft receiving part 70 located radially inward is an arc surface centered on the axis A7. The end surface 70a may have the same curvature radius as the inner circumferential surface 72a of the center wall 72 or may have a larger (or smaller) curvature radius than the inner circumferential surface 72a. In the present embodiment, the axes A8 and A9 coincide with each other (i.e., are aligned on the same straight line), and the shaft receiving parts 68 and 70 are concentrically arranged with reference to the axes A8 and A9.

Referring again to FIG. 2, the lid body 62 includes a main body part 62a and a guide part 62b. The main body part 62a is a flat plate-shaped member, is fixed to an axially front end of the peripheral wall 66 with a fastening tool such as a bolt (not illustrated), and blocks an opening defined on the axially front side of the casing main body 60. A through-hole 62c is formed at the center of the main body part 62a.

Figure 2:
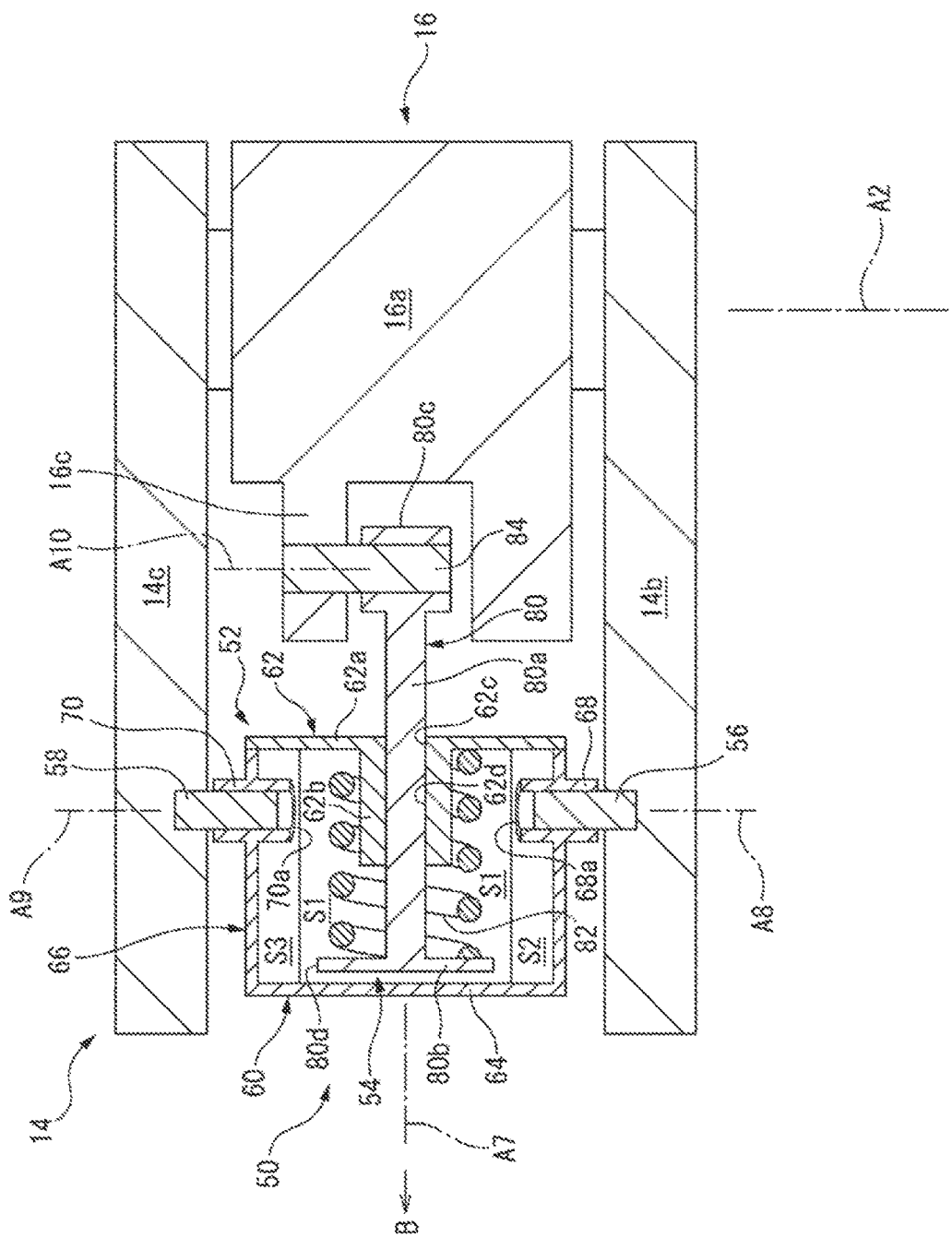
FIG. 2 is a sectional view of a balancer unit illustrated in FIG. 1.

The guide part 62b has a cylindrical shape and is formed integrally with the main body part 62a so as to extend axially rearward from the main body part 62a. Note that the guide part 62b may be provided to be further extended axially frontward from the main body part 62a. The inner circumferential surface 62d of the guide part 62b communicates with the through-hole 62c of the main body part 62a in the axial direction. In a state in which the lid body 62 is fixed to the casing main body 60 as illustrated in FIG. 2, the center axis of the guide part 62b substantially coincides with the axis A7. Note that in the present embodiment, the inner circumferential surface 62d is configured with a slide bearing.

The casing 52 is arranged between the support walls 14b and 14c of the swivel body 14 such that the casing 52 can rotate about the support shaft 56 provided at the support wall 14b and the support shaft 58 provided at the support wall 14c. As illustrated in FIG. 2, the center axis of the support shaft 56 coincides with the axis A8, and the center axis of the support shaft 58 coincides with the axis A9 in a state in which the casing 52 is supported by the support shafts 56 and 58.

In other words, the shaft receiving parts 68 and 70 and the support shafts 56 and 58 are concentrically arranged with reference to the axes A8 and A9 and extend in the direction orthogonal to the axial direction (i.e., the radial direction). Also, the axes A8 and A9 are substantially parallel to the axis A2 (in other words, the axial direction of the casing 52 is substantially orthogonal to the axis A2).

The biasing mechanism 54 generates a moment Mc at the lower arm 16 by biasing the lower arm 16. The biasing mechanism 54 includes a rod 80 and a biasing element 82. The rod 80 is arranged substantially concentrically with the casing 52 with reference to the axis A7 and is received in the guide part 62b of the lid body 62 so as to advance and retract.

Specifically, the rod 80 includes a columnar shaft part 80a extending straight in the axial direction, a disk-shaped flange part 80b projecting outward from the axially rear end of the shaft part 80a, and a cylindrical part 80c fixedly provided at the axially front end of the shaft part 80a. The shaft part 80a is inserted into the guide part 62b and the through-hole 62c so as to advance and retract in the axial direction.

The flange part 80b is accommodated in the internal space S1, while the cylindrical part 80c is exposed to the outside of the casing 52. The shaft part 80a and the flange part 80b are surrounded by the peripheral wall 66 of the casing main body 60 and are arranged concentrically with the center wall 72 of the peripheral wall 66 with reference to the axis A7.

Note that in the present embodiment, the outer circumferential surface 80d of the flange part 80b is arranged to be slightly spaced radially inward from the inner circumferential surface 72a of the center wall 72. The outer circumferential surface 80d of the flange part 80b is substantially parallel to the inner circumferential surface 72a of the center wall 72 and the end surfaces 68a and 70a of the shaft receiving parts 68 and 70.

Alternatively, the outer circumferential surface 80d of the flange part 80b and the inner circumferential surface 72a of the center wall 72 may be in contact with each other. In this case, the inner circumferential surface 72a may be configured with a slide bearing, or a lubricant oil may be applied to the inner circumferential surface 72a. The cylindrical part 80c has a center axis A10 and receives a coupling shaft 84 therein so as to be relatively rotatable. The axis A10 is orthogonal to the axis A7 (or is parallel to the axis A2).

The biasing element 82 is accommodated in the internal space S1 and biases the rod 80. In the present embodiment, the biasing element 82 is an elastic member (more specifically, a compression coil spring) and is inserted between the flange part 80b of the rod 80 and the main body part 62a of the lid body 62. The biasing element 82 biases the rod 80 axially rearward by applying an elastic force to the flange part 80b to cause the flange part 80b to be spaced from the main body part 62a.

The rod 80 includes the cylindrical part 80c rotatably coupled to the lower arm 16 via the coupling shaft 84. More specifically, a cylindrical part 16c is fixedly provided at the proximal end part 16a of the lower arm 16 to as to project outward from the proximal end part 16a. The cylindrical part 16c is arranged concentrically with the cylindrical part 80c of the rod 80 with reference to the axis A10 and receives the coupling shaft 84. In this manner, the rod 80 includes the cylindrical part 80c rotatably coupled to the cylindrical part 16c of the lower arm 16 via the coupling shaft 84.

Once the lower arm 16 rotates about the axis A2 from an upright orientation substantially parallel to the vertical direction and leans toward a horizontal orientation substantially parallel to the horizontal direction, a gravity moment Mg (FIG. 1) acts on the lower arm 16 due to gravity. In order to cancel out such a gravity moment Mg, the biasing mechanism 54 applies a moment Mc in the direction opposite to the gravity moment Mg to the lower arm 16 by biasing the lower arm 16.

More specifically, once the lower arm 16 leans toward the horizontal orientation, the rod 80 is pulled axially frontward by the cylindrical part 16c turning around the axis A2 via the coupling shaft 84, is thus pulled out from the casing 52, and moves axially frontward. Thus, the biasing element 82 is compressed in the axial direction, an axially rearward elastic force is applied to the rod 80 (specifically, the flange part 80b) as a reactive force thereof, and the rod 80 is thereby biased axially rearward.

As a result, the rod 80 biases the lower arm 16 in the direction opposite to the gravity moment Mg by applying a force to the cylindrical part 16c via the coupling shaft 84, thereby generating the moment Mc at the lower arm 16. In this manner, the balancer unit 50 balances the lower arm 16 against the gravity.

On the other hand, the rod 80 moves axially rearward and is pushed into the casing 52 as the lower arm 16 rises toward the vertical orientation. Such a advancing and retracting movement of the rod 80 in the axial direction is guided by the guide part 62b of the lid body 62. Then, the balancer unit 50 rotates about the support shafts 56 and 58 (i.e., the axes A8 and A9) in response to the advancing and retracting movement of the rod 80. The shaft receiving parts 68 and 70 of the casing main body 60 support such an advancing and retracting movement of the rod 80 and the rotational movement of the balancer unit 50 around the axes A8 and A9.

As described above, the casing 52 includes the peripheral wall 66 surrounding the biasing mechanism 54 (specifically, the shaft part 80a and the flange part 80b) and the shaft receiving parts 68 and 70 provided at the peripheral wall 66 so as to project inward from the inner circumferential surface 66a of the peripheral wall 66 in the present embodiment.

Here, the present inverter carried out simulation analysis of a stress generated at the casing 52 when the balancer unit 50 was operated. As a result, it has been found that stress concentration generated at the casing 52 can be reduced by forming the shaft receiving parts 68 and 70 so as to project inward from the peripheral wall 66.

According to the present embodiment, supporting the advancing and retracting movement of the rod 80 and the rotational movement of the balancer unit 50 by the shaft receiving parts 68 and 70 which are provided so as to project inward from the peripheral wall 66, the stress concentration is suppressed from occurring at the casing 52 (specifically, the casing main body 60), thereby preventing the casing 52 from being deformed and damaged.

As a result, the stress concentration can be reduced without increasing the thickness of the casing main body 60, so it is possible to prevent air bubbles (so-called casting nests) from being formed in materials when the casing main body 60 is molded and also to reduce the thickness of the casing main body 60, and thus it is possible to avoid increasing the size and weight of the casing main body 60. It is thus possible to reduce the size and weight of the balancer unit 50. Also, an unbalanced load on the casing main body 60 is avoided by suppressing the stress concentration, and long lifetime of the balancer unit 50 can be realized.

Also, in the present embodiment, the shaft receiving parts 68 and 70 further project outward from the outer circumferential surface 66*b* of the peripheral wall 66. According to the configuration, the length of the shaft receiving parts 68 and 70 in the direction of the axes A8 and A9 can be set to be large while reducing the projection length of the shaft receiving parts 68 and 70 projecting radially outward from the outer circumferential surface 66*b*. This makes it possible effectively suppress stress concentration on the casing main body 60 and to increase the strength of the shaft receiving parts 68 and 70.

Also, in the present embodiment, the peripheral wall 66 includes the center wall 72 arranged concentrically with the biasing mechanism 54 (specifically, the shaft part 80*a* and the flange part 80*b*) and the expanding walls 74 and 76 expanding outward from the outer circumferential surface 72*b* of the center wall 72, and the shaft receiving parts 68 and 70 are provided at the expanding walls 74 and 76 so as to project inward from the inner circumferential surface of the expanding walls 74 and 76 (specifically, the inner surfaces 74*f* and 76*f*).

According to the configuration, the dimension (i.e., the radius) of the center wall 72 can be minimized, and the strength of the expanding walls 74 and 76 can be increased by laterally expanding the expanding walls 74 and 76 provided with the shaft receiving parts 68 and 70. This makes it possible to suppress an increase in the total weight of the casing main body 60.

Also, in the present embodiment, the expanding walls 74 and 76 extend from the axially front end to the axially rear end of the center wall 72 and extend with the constant width W when viewed from the radial direction of the center wall 72. According to the configuration, it is possible to effectively increase the strength of the expanding walls 74 and 76. Also, in the present embodiment, the expanding walls 74 and 76 have a rectangular outer shape when viewed from the axial direction of the center wall 72. According to the configuration, it is possible to more effectively increase the strength of the expanding walls 74 and 76.

Also, in the present embodiment, the biasing mechanism 54 includes the rod 80 coupled to the rotating element (specifically, the lower arm) 16 and received in the casing 52 so as to advance and retract, and the biasing element 82 accommodated in the casing 52 and configured to bias the rod 80. The support shafts 56 and 58 extend in the direction (i.e., the radial direction) orthogonal to the advancing and retracting direction (i.e., the axial direction) of the rod 80.

The configuration makes it possible to efficiently apply the biasing force generated by the biasing element 82 to the rotating element 16 through the rod 80, and the casing 52 can rotate about the support shafts 56 and 58 (specifically, the axes A7 and A8) in accordance with the advancing and retracting movement of the rod 80, and thus the advancing and retracting movement of the rod 80 can be effectively supported. It is thus possible to effectively generate the moment Mc at the rotating element 16.

Moreover, in the present embodiment, the biasing element 82 includes the elastic member (compression coil spring) inserted between the rod 80 (specifically, the flange part 80*b*) and the casing 52 (specifically, the main body part 62*a* of the lid body 62) and configured to bias the rod 80 by applying an elastic force to the rod 80. This configuration makes it possible to effectively apply a biasing force to the rod 80 by the elastic member with a relatively simple structure like the compression coil spring.

Note that in the present embodiment, a connecting part between the center wall 72 and the side wall part 74*a* or 74*b*, between the center wall 72 and the side wall part 76*a* or 76*b*, between the side wall part 74*a* or 74*b* and the end wall part 74*c*, between the side wall part 76*a* or 76*b* and the end wall part 76*c*, between the shaft receiving part 68 and the end wall part 74*c*, or between the shaft receiving part 70 and the end wall part 76*c* may be formed into a rounded corner (so-called corner R). This makes it possible to more effectively avoid stress concentration occurring at the casing main body 60.

Also, a projection length L1 (FIG. 5) by which the shaft receiving part 68 projects radially inward from the inner surface 74*f* of the end wall part 74*c*, and a projection length L2 by which the shaft receiving part 68 projects radially outward from the outer surface 74*g* of the end wall part 74*c* may satisfy L1=L2, L1>L2, or L1<L2. Similarly, the projection length L1 by which the shaft receiving part 70 projects radially inward from the inner surface 76*f* of the end wall part 76*c*, and the projection length L2 by which the shaft receiving part 70 projects radially outward from the outer surface 76*g* of the end wall part 76*c* may satisfy L1=L2, L1>L2, or L1<L2.

Also, the aforementioned biasing element 82 may be configured with a tensile coil spring inserted between the flange part 80*b* and the main body part 62*a*. In this case, the biasing element 82 biases the rod 80 axially frontward by applying an elastic force to the flange part 80*b* so as to bring the flange part 80*b* closer to the lid body 62.

Figure 6:
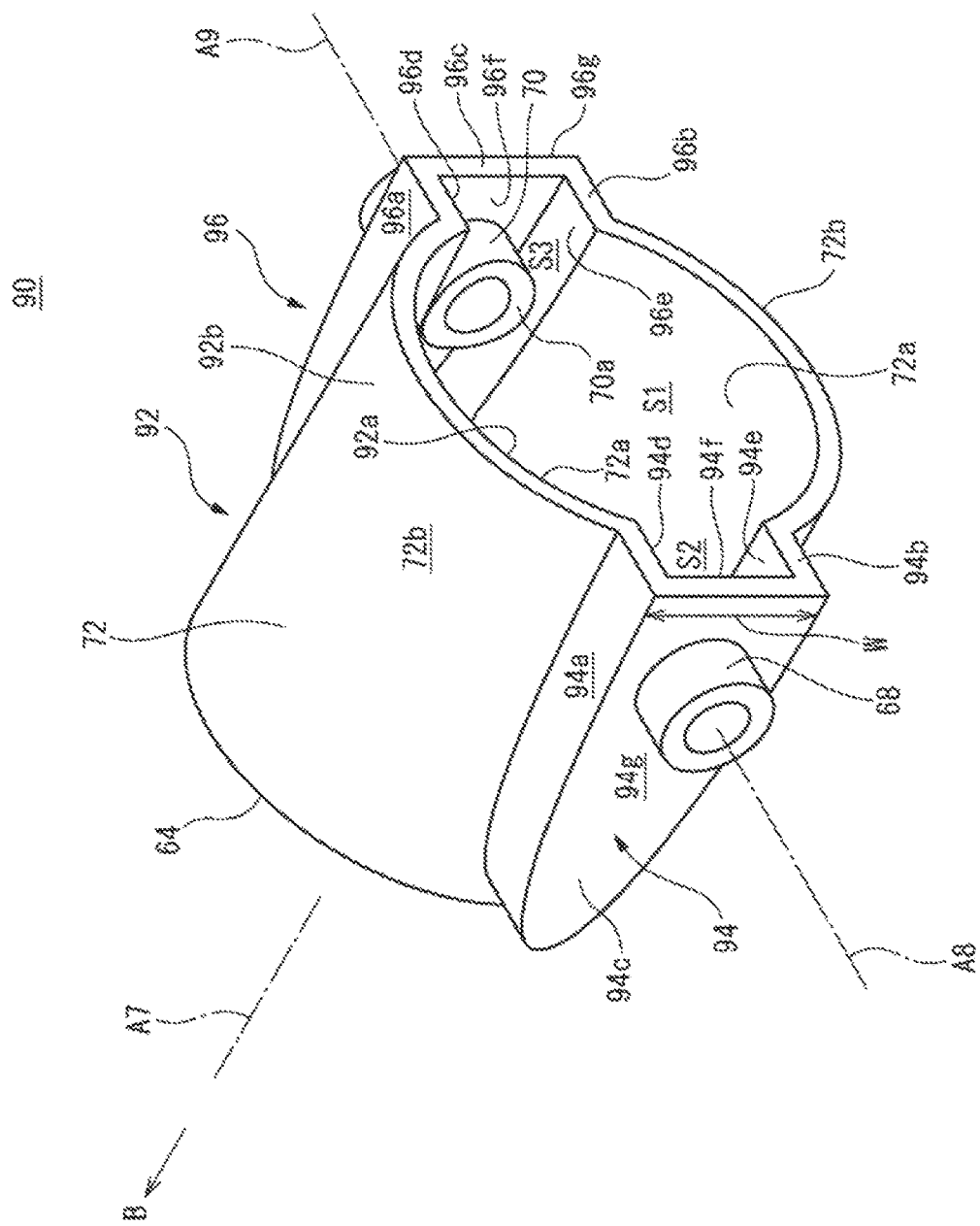
FIG. 6 is a perspective view of a casing main body according to another embodiment.

Note that various modification examples of the casing main bodies 60 are conceivable. Hereinafter, modification examples of the casing main body 60 will be described with reference to FIGS. 6 to 11. A casing main body 90 illustrated in FIG. 6 is different from the aforementioned casing main body 60 in a peripheral wall 92. The peripheral wall 92 includes the aforementioned center wall 72 and a pair of expanding walls 94 and 96 formed integrally with the center wall 72 so as to expand radially outward from the outer circumferential surface 72*b* of the center wall 72.

Each of the expanding walls 94 and 96 extends such that the width W decreases from the axially front end to the axially rear end of the center wall 72. More specifically, the expanding wall 94 includes a pair of side wall parts 94*a* and 94*b* facing each other and extending radially outward from the outer circumferential surface 72*b* and an end wall part 94*c* orthogonal to the side wall parts 94*a* and 94*b*.

An inner surface 94*d* of the side wall part 94*a*, an inner surface 94*e* of the side wall part 94*b*, and an inner surface 94*f* of the end wall part 94*c* define the internal space S2 expanding radially outward from the internal space S1. The side wall parts 94*a* and 94*b* extend to approach each other from the axially front end toward the axially rear end of the center wall 72 and are connected to each other at the axially rear end. In this manner, the width W of the expanding wall 94 reduces axially rearward.

On the other hand, the expanding wall 96 has a rotationally symmetrical shape obtained by rotating the expanding wall 94 180° around the axis A7. Specifically, the expanding wall 96 includes a side wall part 96*a*, a side wall part 96*b*, and an end wall part 96*c* corresponding to the side wall part 94a, the side wall part 94b, and the end wall part 94c, respectively. An inner surface 96d of the side wall part 96a, an inner surface 96e of the side wall part 96b, and an inner surface 96f of the end wall part 96c define the internal space S3 expanding radially outward from the internal space S1.

Also, the inner circumferential surface 72a of the center wall 72, inner surfaces (inner surfaces 94d, 94e, 94f, 96d, 96e, and 96f) of the expanding walls 94 and 96 define an inner circumferential surface 92a of the peripheral wall 92. On the other hand, the outer circumferential surface 72b of the center wall 72 and the outer surfaces of the expanding walls 94 and 96 define an outer circumferential surface 92b of the peripheral wall 92.

The shaft receiving part 68 is provided integrally with the end wall part 94c so as to project radially inward from the inner surface 94f of the end wall part 94c and project radially outward from the outer surface 94g of the end wall part 94c. On the other hand, the shaft receiving part 70 is provided integrally with the end wall part 96c so as to project radially inward from the inner surface 96f of the end wall part 96c and project radially outward from the outer surface 96g of the end wall part 96c.

Note that the expanding walls 94 and 96 may be formed so as to have substantially elliptical outer shapes when viewed from the directions (i.e., radially outward) of the axes A8 and A9. This configuration makes it possible to improve aesthetics of the casing main body 90. Also, the expanding walls 94 and 96 may extend axially rearward from the axially front end of the center wall 72 and end at the position located further axially frontward than the bottom wall 64. In this case, the axially rear end of the center wall 72 has an annular shape, and the bottom wall 64 has the same outer shape as that of the center wall 72 and is provided integrally with the axially rear end of the center wall 72.

Note that a connecting part between the center wall 72 and the side wall part 94a or 94b, between the center wall 72 and the side wall part 96a or 96b, between the side wall part 94a or 94b and the end wall part 94c, between the side wall part 96a or 96b and the end wall part 96c, between the shaft receiving part 68 and the end wall part 94c, or between the shaft receiving part 70 and the end wall part 96c may be formed into a rounded corner.

Figure 7:
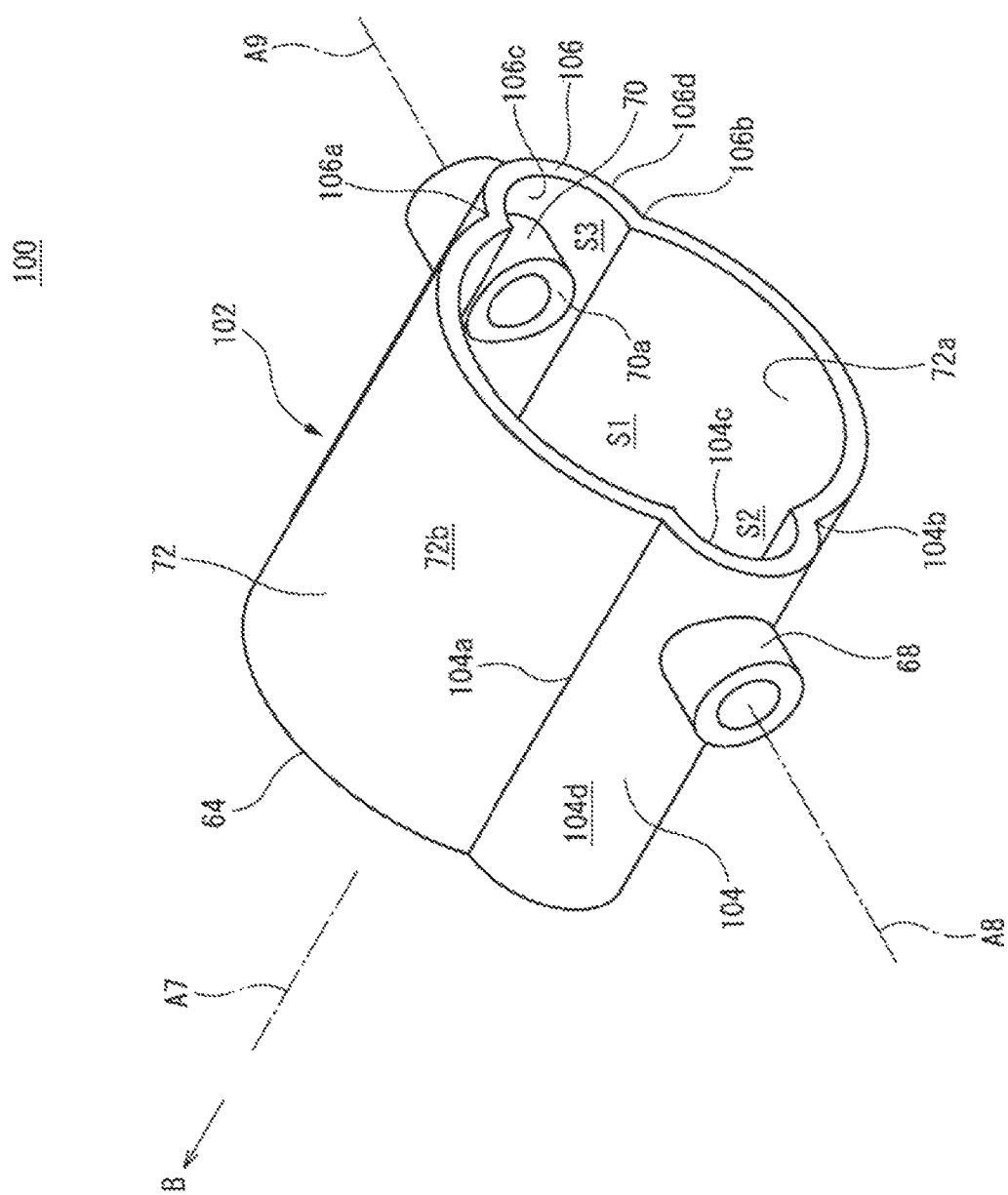
FIG. 7 is a perspective view of a casing main body according to yet another embodiment.
Figure 8:
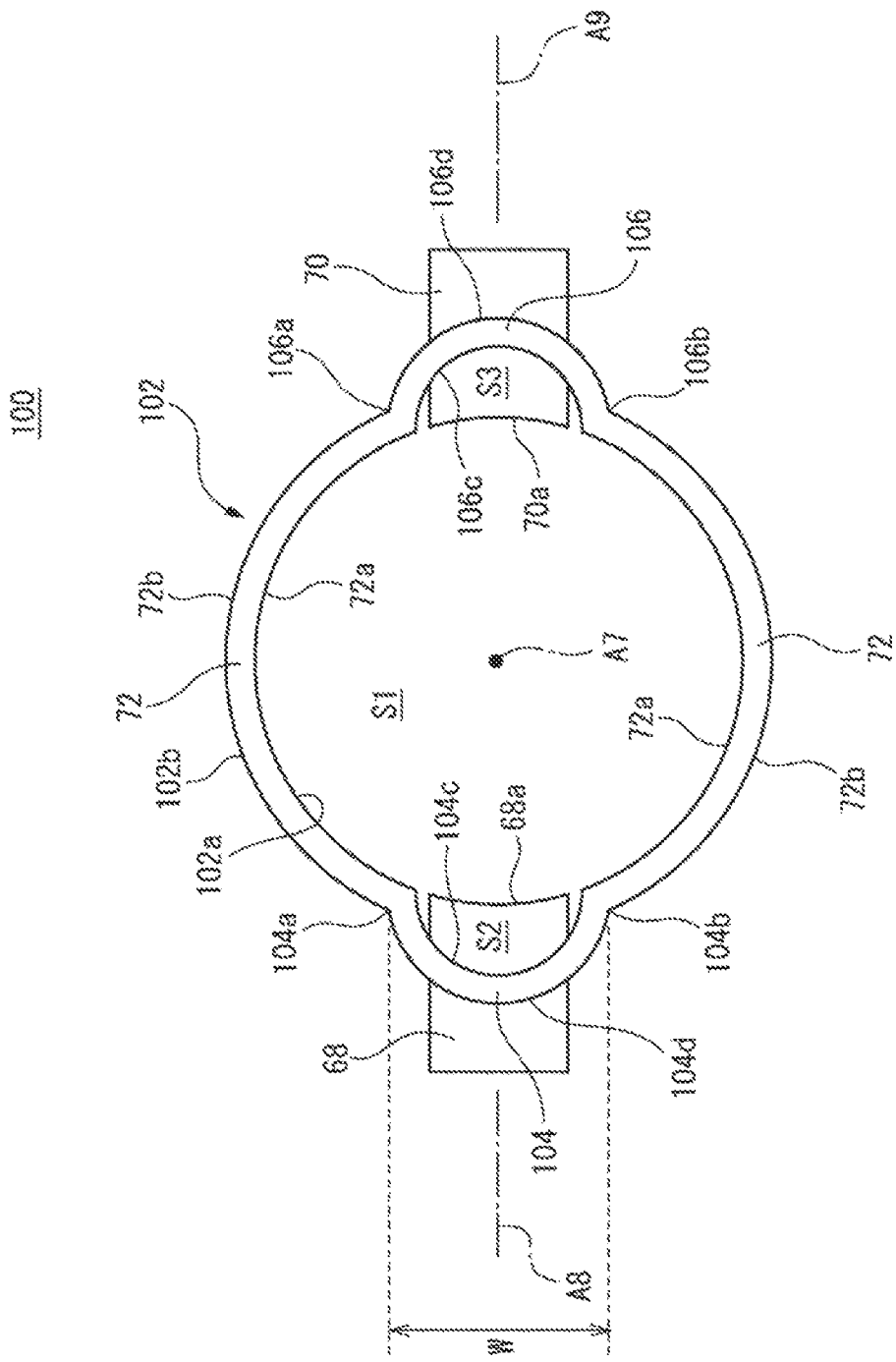
FIG. 8 is a front view of the casing main body illustrated in FIG. 7 when viewed from the axial direction.

A casing main body 100 illustrated in FIGS. 7 and 8 is different from the aforementioned casing main body 60 in a peripheral wall 102. The peripheral wall 102 includes the aforementioned center wall 72 and a pair of expanding walls 104 and 106 formed integrally with the center wall 72 such that the expanding walls 104 and 106 expand radially outward from the outer circumferential surface 72b of the center wall 72.

Each of the expanding walls 104 and 106 has a circular outer shape when viewed from the axial direction. More specifically, the expanding wall 104 extends in an arc shape so as to expand radially outward from an end edge 104a in one direction of the circumferential direction to an end edge 104b in the other direction of the circumferential direction, and extends with the constant width W (FIG. 8) from the axially front end to the axially rear end of the center wall 72. An arc-shaped inner circumferential surface 104c of the expanding wall 104 defines the internal space S2 expanding radially outward from the internal space S1.

Similarly, the expanding wall 106 extends in an arc shape so as to expand radially outward from an end edge 106a in one direction of the circumferential direction to an end edge 106b in the other direction of the circumferential direction, and extends with the constant width W from the axially front end to the axially rear end of the center wall 72. An arc-shaped inner circumferential surface 106c of the expanding wall 106 defines the internal space S3 expanding radially outward from the internal space S1. Each of the expanding walls 104 and 106 has a smaller curvature radius than the center wall 72 and the end surfaces 68a and 70a.

The inner circumferential surface 72a of the center wall 72 and inner circumferential surfaces 104c and 106c of the expanding walls 104 and 106 define an inner circumferential surface 102a of the peripheral wall 102. On the other hand, the outer circumferential surface 72b of the center wall 72, an outer circumferential surface 104d of the expanding wall 104, and an outer circumferential surface 106d of the expanding wall 106 define an outer circumferential surface 102b of the peripheral wall 102.

The shaft receiving part 68 is provided integrally with the expanding wall 104 so as to project radially inward from the inner circumferential surface 104c of the expanding wall 104 and project radially outward from the outer circumferential surface 104d of the expanding wall 104. Also, the shaft receiving part 70 is provided integrally with the expanding wall 106 so as to project radially inward from the inner circumferential surface 106c of the expanding wall 106 and project radially outward from the outer circumferential surface 106d of the expanding wall 106.

In the present embodiment, the expanding walls 104 and 106 have the circular outer shapes when viewed from the axial direction, and it is thus possible to effectively suppress occurrence of stress concentration on the expanding walls 104 and 106. This makes it possible to improve the strength of the expanding walls 104 and 106. Note that a connecting part between the center wall 72 and the expanding wall 104 or 106, between the shaft receiving part 68 and the end wall part 94c, or between the shaft receiving part 70 and the end wall part 96c may be formed into a rounded corner.

Figure 9:
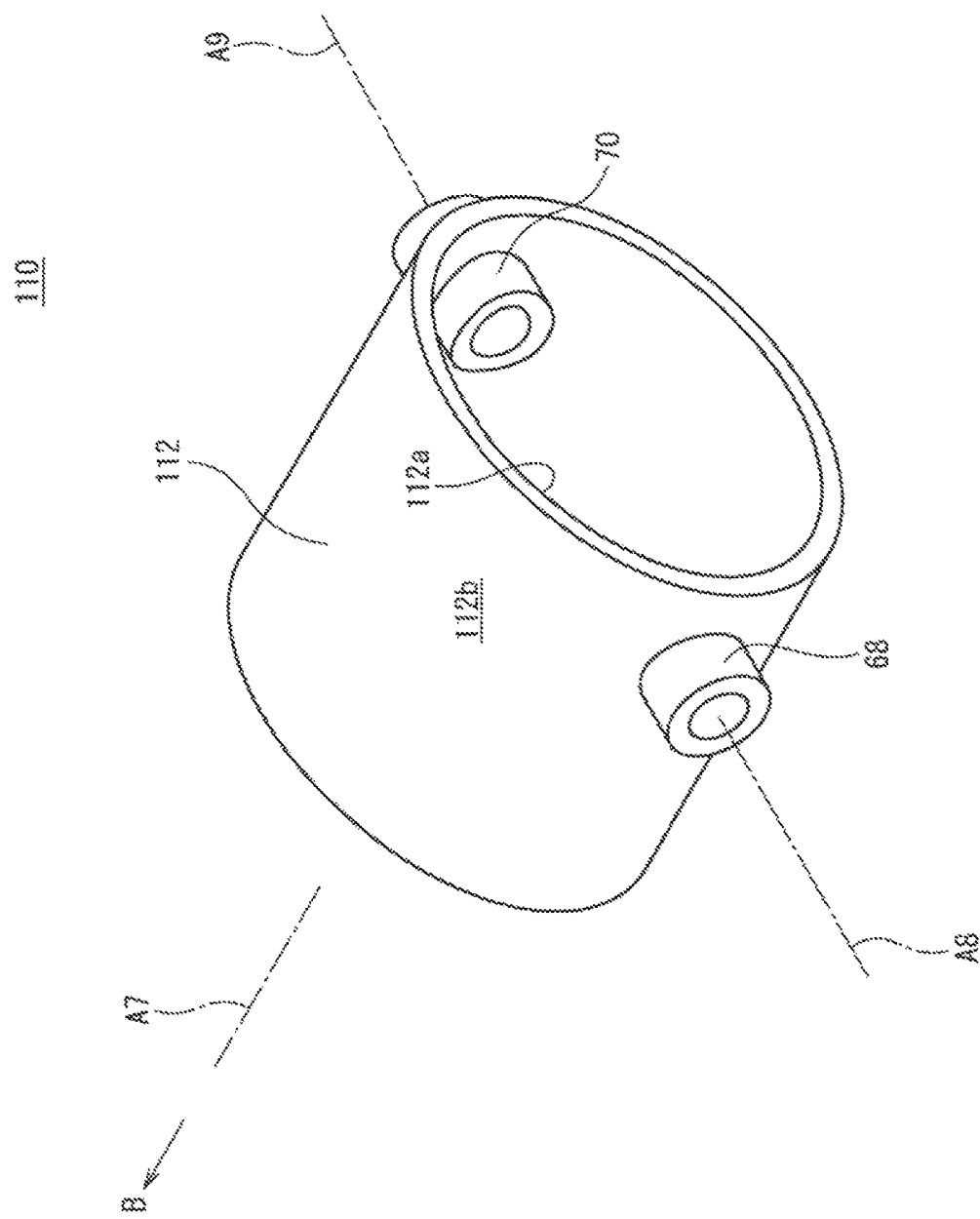
FIG. 9 is a perspective view of a casing main body according to yet another embodiment.
Figure 10:
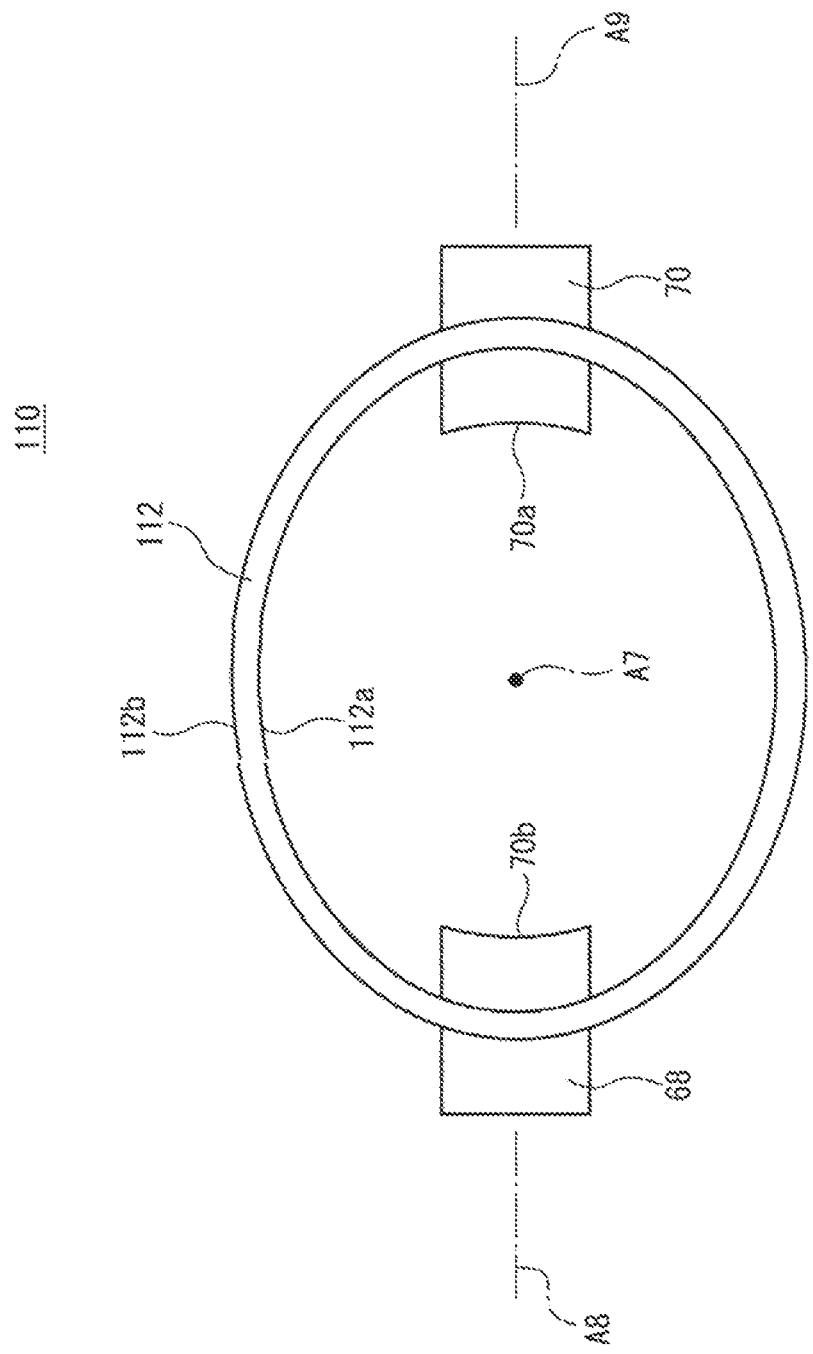
FIG. 10 is a front view of the casing main body illustrated in FIG. 9 when viewed from the axial direction.

A casing main body 110 illustrated in FIGS. 9 and 10 is different from the aforementioned casing main body 60 in a peripheral wall 112. The peripheral wall 112 has an elliptical outer shape having a long axis parallel to the extending direction of the support shafts 56 and 58. More specifically, the peripheral wall 112 has an elliptical outer shape having a long axis that coincides with the axes A8 and A9 and a short axis orthogonal to the axes A7, A8, and A9.

Each of the shaft receiving parts 68 and 70 is formed integrally with the peripheral wall 112 such that each of the shaft receiving parts 68 and 70 extends radially inward from an inner circumferential surface 112a of the peripheral wall 112 and extends radially outward from an outer circumferential surface 112b of the peripheral wall 112. In the present embodiment, the peripheral wall 112 has the elliptical outer shape, and it is thus possible to effectively suppress occurrence of stress concentration on the peripheral wall 112. This makes it possible to increase the strength of the peripheral wall 112.

Note that a connecting part between the peripheral wall 112 and the shaft receiving part 68 or 70 may be formed into a rounded corner. Also, the peripheral wall 112 is not limited to the elliptical shape and may have any (e.g., a polygonal shape such as an oblong, a rhombus, or a hexagon) outer shape having a longitudinal direction in the direction of the axes A8 and A9 when viewed from the axial direction.

Figure 11:
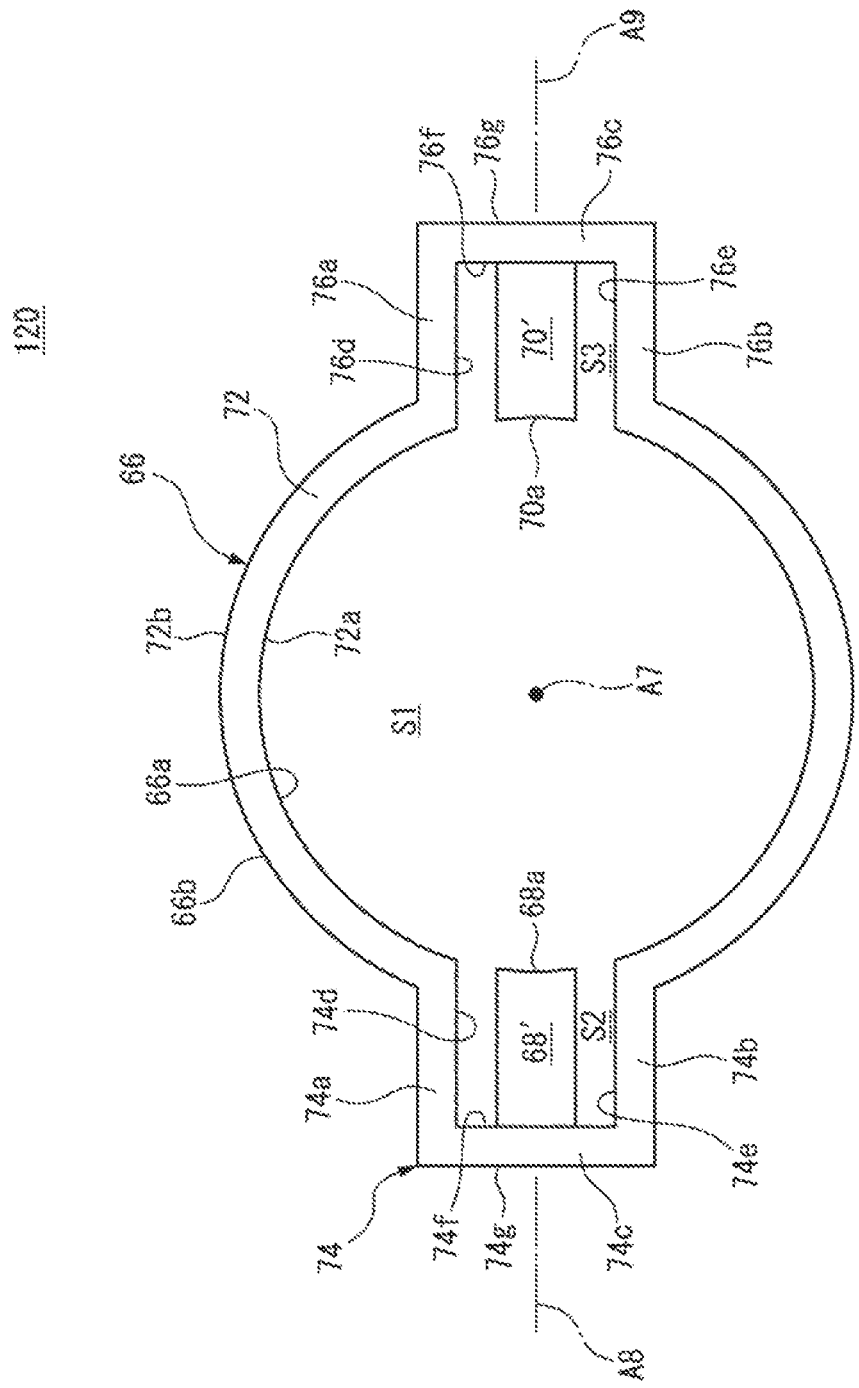
FIG. 11 is a front view of a casing main body according to yet another embodiment when viewed from the axial direction.

A casing main body 120 illustrated in FIG. 11 is different from the aforementioned casing main body 60 in shaft receiving parts 68' and 70'. In the present embodiment, the shaft receiving part 68' projects radially inward from the inner surface 74f of the end wall part 74c while the shaft receiving part 68' does not project outward from the outer surface 74g of the end wall part 74c.

Similarly, the shaft receiving part 70' projects radially inward from the inner surface 76f of the end wall part 76c while the shaft receiving part 70' does not project outward from the outer surface 76g of the end wall part 76c. Note that a connecting part between the end wall part 74c and the shaft receiving part 68' or between the end wall part 76c and the shaft receiving part 70' may be formed into a rounded corner. Also in the present embodiment, stress concentration on the casing main body 120 can be suppressed, thereby reducing the thickness of the casing main body 120, so that the size and weight of the balancer unit 50 can be reduced.

Note that the shaft receiving parts 68' and 70' may be applied to the aforementioned casing main body 90, 100, or 110. In this case, the shaft receiving parts 68' and 70' project inward from the inner circumferential surface of the peripheral wall 92, 102, or 112, but do not project outward from the outer circumferential surface of the peripheral wall 92, 102, or 112.

Figure 12:
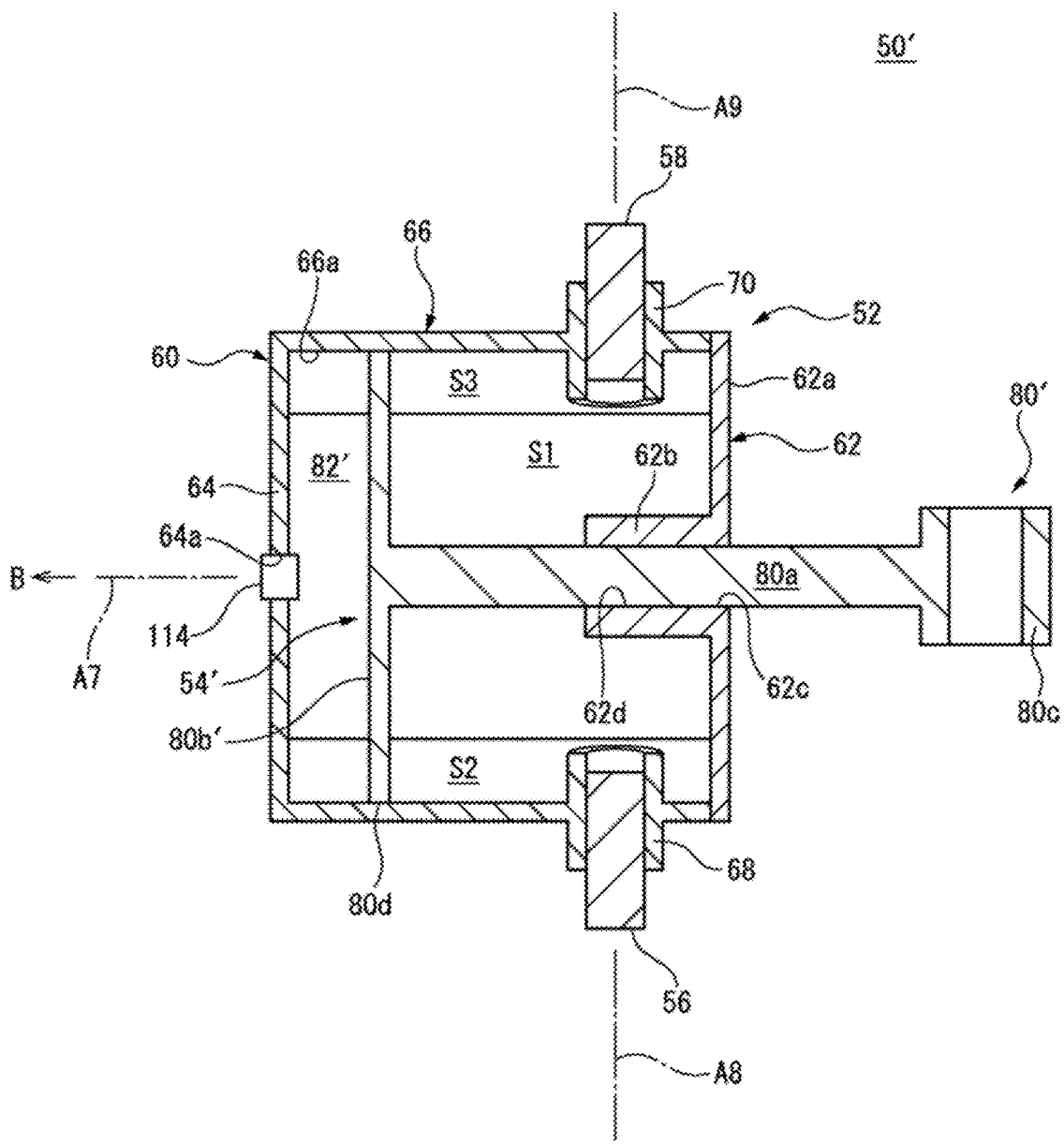
FIG. 12 is a cross-sectional view of a balancer unit according to another embodiment.

Note that the case where the biasing mechanism 54 includes the biasing element 82 that is an elastic member has been described in the aforementioned embodiments. However, the biasing element may also consist of a fluid. Such a configuration is illustrated in FIG. 12. A balancer unit 50' illustrated in FIG. 12 includes the casing 52 and a biasing mechanism 54', and the biasing mechanism 54' includes a rod 80' and a biasing element 82'. The rod 80' includes the aforementioned shaft part 80a and cylindrical part 80c, and a flange part 80b projecting outward from the axially rear end of the shaft part 80a. The flange part 80b' has the same outer shape as the peripheral wall 66 and is slidably in close contact with the inner circumferential surface 66a of the peripheral wall 66.

In the present embodiment, the biasing element 82' is a fluid sealed in the spaces S1, S2, and S3 between the rod 80' and the casing 52. More specifically, the biasing element 82' is gas or oil, for example, and is sealed in a space between the flange part 80b' of the rod 80' and the bottom wall 64 of the casing main body 60 in the internal spaces S1, S2, and S3 of the casing 52.

When a negative pressure is applied to the biasing element 82', for example, the biasing element 82' acts similarly to the biasing element 82 including a compression coil spring and applies a pressure to the flange part 80b' so as to separate the flange part 80b' from the lid body 62, thereby biasing the rod 80' axially rearward.

On the other hand, when a positive pressure is applied to the biasing element 82', the biasing element 82' acts similarly to the biasing element 82 including a tensile coil spring and applies a pressure to the flange part 80b' so as to bring the flange part 80b' closer to the lid body 62, thereby biasing the rod 80' axially frontward.

A fluid introduction part 64a may be formed at the bottom wall 64 of the casing main body 60, and the biasing element 82' may be introduced into the internal spaces S1, S2, and S3 of the casing 52 through the fluid introduction port 64a. After the introduction of the biasing element 82', the fluid introduction port 64a may be tightly closed by a plug 114.

Note that at least one of the aforementioned axes A8 or A9 may be inclined with respect to the axis A7 (or the axis A2). Also, the shaft receiving part 68 or 70 is not limited to the cylindrical shape, may have a polygonal outer shape, for example, and may have any hollow shape. In addition, the aforementioned center wall 72 is not limited to the cylindrical shape, and may have an elliptical shape having a long axis that coincides with the axes A8 and A9, for example, or may have any other outer shapes. Also, the expanding wall 74, 76, 94, 96, 104, or 106 is not limited to the rectangular shape or the circular shape when viewed from the axial direction and may have any outer shape.

Also, the case where the pair of shaft receiving parts 68 and 70 are provided at the casing main body 60. 90, 100, and 110 has been described in the aforementioned embodiments. However, the present disclosure is not limited thereto, and one of the shaft receiving parts 68 and 70 may be omitted. For example, in the casing main body 60, 90, 100, or 110, a support shaft 58' projecting radially outward from the peripheral wall 66, 92, 102, or 112 can be formed integrally with the peripheral wall 66 so as to rotatably support the casing main body 60 at the swivel body 14 via the support shaft 58' and the support shaft 56, instead of the shaft receiving part 70. Similarly, one of the pair of shaft receiving parts 68' and 70' may be omitted in the casing main body 120 as well.

Note that the case in which the balancer units 50 and 50' are provided at the swivel body 14 in order to balance the lower arm 16 has been described in the aforementioned embodiments. However, the present disclosure is not limited thereto, and the balancer unit 50 or 50' may be provided at the distal end part 16b of the lower arm 16 in order to balance the upper arm 18, for example, or may be provided in order to balance any of the rotating elements 14, 16, 18a, 18b, 20a, and 20b of the machine 10.

Moreover, the machine 10 is not limited to the vertical articulated robot and may be a machine of any type including a rotating element, such as a horizontal articulated robot, a parallel link robot, a rotating positioner that rotates a workpiece, or the like. Although the present disclosure has been described through the embodiments above, the embodiments described above do not limit the scope of the invention claimed in the claims.

REFERENCE SIGNS LIST

10 Machine
14, 16, 18a, 18b, 20a, 20b Rotating element
50 Balancer unit
52 Casing
54, 54' Biasing mechanism
56, 58 Support shaft
60, 90, 100, 110, 120 Casing main body
62 Lid body
66, 92, 102, 112 Peripheral wall
68, 68', 70, 70' Shaft receiving part
72 Center wall
74, 76, 94, 96, 104, 106 Expanding wall
80, 80' Rod
82, 82' Biasing mechanism

The invention claimed is:

1. A balancer unit configured to apply a moment to a rotating element of a machine for balancing the rotating element, the balancer unit comprising:
 a biasing mechanism configured to bias the rotating element to generate the moment; and
 a casing rotatably supported by the machine via a support shaft, and configured to receive the biasing mechanism, wherein the casing includes:
 a peripheral wall surrounding the biasing mechanism; and
 a hollow shaft receiving part provided at the peripheral wall so as to project inward from an inner circumferential surface of the peripheral wall, and configured to receive the support shaft so as to be relatively rotatable, the hollow shaft receiving part receiving the support shaft such that the support shaft projects inward from the inner circumferential surface.

2. The balancer unit of claim 1, wherein the shaft receiving part further projects outward from an outer circumferential surface of the peripheral wall.

3. The balancer unit of claim 1, wherein the peripheral wall has an elliptical outer shape having a long axis parallel to an extending direction of the support shaft.

4. The balancer unit of claim 1,
wherein the biasing mechanism includes:
a rod coupled to the rotating element and received in the casing so as to advance and retract; and
a biasing element accommodated in the casing and configured to bias the rod,
wherein the support shaft extends in a direction orthogonal to an advancing and retracting direction of the rod.

5. The balancer unit of claim 4, wherein the biasing element includes:
an elastic member inserted between the rod and the casing, and configured to bias the rod by applying an elastic force to the rod, or
a fluid sealed in a space between the rod and the casing, and configured to bias the rod by applying a pressure to the rod.

6. A machine comprising the balancer unit of claim 1.

7. The machine of claim 6, wherein the machine is an articulated robot including an arm as the rotating element,
wherein the balancer unit applies the moment in a direction opposite to a gravity moment acting on the arm due to gravity by the biasing mechanism biasing the arm, whereby balancing the arm against the gravity.

8. A balancer unit configured to apply a moment to a rotating element of a machine for balancing the rotating element, the balancer unit comprising:

a biasing mechanism configured to bias the rotating element to generate the moment; and
a casing rotatably supported by the machine via a support shaft, and configured to receive the biasing mechanism,
wherein the casing includes:
a peripheral wall surrounding the biasing mechanism; and
a hollow shaft receiving part provided at the peripheral wall so as to project inward from an inner circumferential surface of the peripheral wall, and configured to receive the support shaft so as to be relatively rotatable,
wherein the peripheral wall includes:
a center wall arranged concentrically with the biasing mechanism; and
an expanding wall expanding outward from an outer circumferential surface of the center wall,
wherein the shaft receiving part is provided at the expanding wall so as to project inward from the inner circumferential surface of the expanding wall.

9. The balancer unit of claim 3, wherein the expanding wall extends from one end to the other end of the center wall in an axial direction.

10. The balancer unit of claim 4, wherein the expanding wall extends with a constant width from the one end to the other end, or extends with a width decreasing from the one end toward the other end, when viewed from a radial direction of the center wall.

11. The balancer unit of claim 3, wherein the expanding wall has a rectangular or circular outer shape when viewed from an axial direction of the center wall.

* * * * *